Jan. 12, 1954 A. W. LUNDELL 2,665,726
GUIDE FOR SLICING MACHINES
Filed Nov. 6, 1952
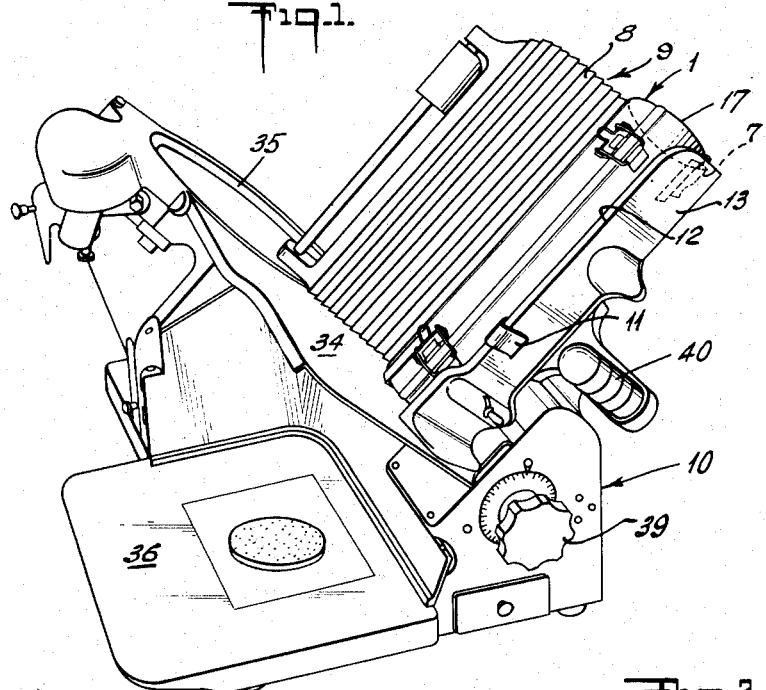
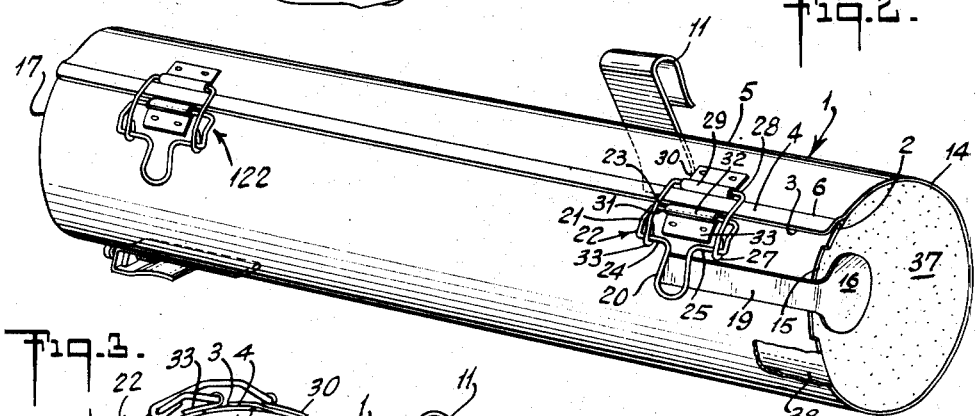
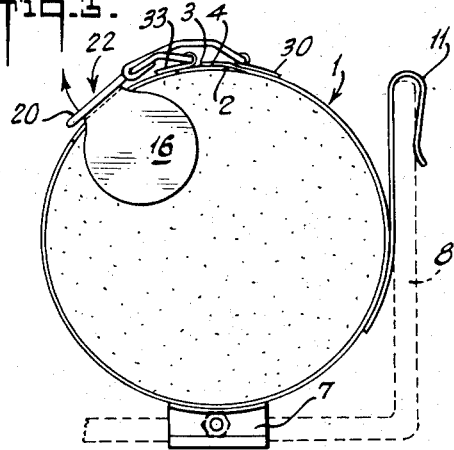
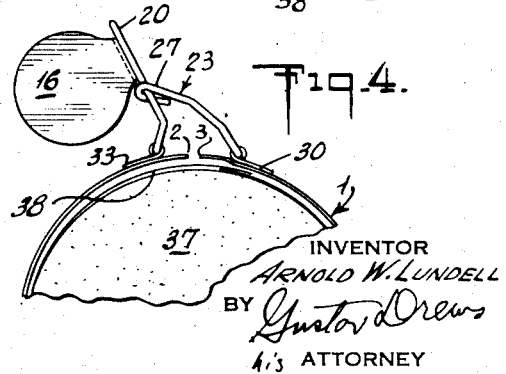
INVENTOR
ARNOLD W. LUNDELL
BY Gustov Drews
his ATTORNEY

UNITED STATES PATENT OFFICE 2,665,726

GUIDE FOR SLICING MACHINES

Arnold W. Lundell, Byram, Conn., assignor to Globe Slicing Machine Co., Inc., Stamford, Conn., a corporation of New York Application November 6, 1952, Serial No. 319,008

5 Claims. (Cl. 146—217)

This invention relates to guides for slicing machines in general whereby chopped or processed meat in loaf form is advanced to the knife of a slicing machine to be cut into cakes.

Among the objects of the present invention it is aimed to provide an improved guide for slicing machines such as disclosed in the copending application for patent, Ser. No. 223,631 filed April 28, 1951, which contemplates an arcuate metal shield which can be clamped into substantially cylindrical form as a mold to form a cylindrical loaf of chopped or processed meat and which can be opened to release the enclosed loaf and permit it to slide down along the same into cutting engagement with the knife of a slicing machine, which improved guide is characterized by latches which will remain interlocked with one another to facilitate closing the same after a cake has been cut and dispensed, and furthermore protect the same from being bent out of shape during use.

It is a further object of the present invention to provide an improved guide for slicing machines such as disclosed in the copending application for patent, Ser. No. 223,631 filed April 28, 1951, which contemplates an arcuate metal shield which can be clamped into substantially cylindrical form as a mold to form a cylindrical loaf of chopped or processed meat and which can be opened to release the enclosed loaf and permit it to slide down along the same into cutting engagement with the knife of a slicing machine, which improved guide is characterized by latches which will remain interlocked with one another to facilitate closing the same after a cake has been cut and dispensed, to one of which latches a stop or abutment is secured which will be positioned under the loaf of meat at one end of the shield in closed position of this latch to support the loaf against accidently sliding downward when the shield is closed and which latch will cooperate with this abutment to clear the open end of the shield when the latch is swung into open position.

These and other features, capabilities and advantages of the present invention will appear from the subjoined detailed description of one specific embodiment thereof illustrated in the accompanying drawings, in which Fig. 1 is a perspective of a slicing machine equipped with the improved guide.

Fig. 2 is a perspective enlarged of the guide separated from the slicing machine.

Fig. 3 is an end view still further enlarged of the guide in closed position.

Fig. 4 is a fragmental end view similar to Fig. 3 showing the guide in open position.

In the embodiment shown the guide consists essentially in a sheet metal shield 1 preformed into an arcuate shape which has an inner longitudinally extending edge 2 and an outer longitudinally extending edge 3 formed at the outer edge of the flange 4 offset to the main wall portion 5 by the shoulder 6 so that in open position the edges 2 and 3 will be spaced from one another. The outer face of the wall 5 has adjacent to its upper edge 17 a sheet metal hook 7 extending downwardly and longitudinally of the shield 1 to grip the upper edge of the wing 8 of the chute 9 of a slicing machine 10 such as disclosed in my United States Letters Patent No. 2,558,767, dated July 3, 1951. In addition to the hook 7, the outer face of the wall 5 is also provided with a hook 11 extending transversely in direction to the direction of the hook 7 and preferably tangential to the wall 5 as particularly shown in Fig. 3 so that it may grip the laterally extending edge 12 of the wing 13 as shown in Fig. 1.

The lower edge 14 of the shield 1 is cut away to form the clearance 15 to enable the plate or abutment 16 to pass through the same so that its outer face will aline with the lower edge 14 of the shield 1, which edge 14 is disposed in a plane perpendicular to the axis of the shield 1. The abutment 16 in the present instance is bent at right angles to the arm 19 which extends parallel to the axis of the shield 1 and is connected at its upper end by being welded, soldered or otherwise secured to the wire loop 20 of the bracket 21 of the latch 22 cooperating with the wire bracket 23 to form the latch 22. The bracket 21 preferably as shown has two extensions 24, 25 to form abutments or perches for the looped ends 26 and 27, respectively, of the bracket 23 which is substantially U-shaped with its cross piece 28 rotatably or hingedly disposed in the sleeve 29 of the plate 30 riveted or otherwise secured to the outer face of the wall 5 adjacent the shoulder 6. From the two extensions 24, 25, the wire of the bracket 21 extends away from the loop 20 to form the cross piece 31 rotatably or hingedly disposed in the sleeve 32 of the plate 33 secured to the outer face of the wall 5 adjacent the edge 2 thereof.

Preferably a second latch 122 substantially identical to the latch 22 is disposed adjacent the edge 17 of the shield 1, which latch 122, however, is not provided with an arm 19 and abutment 16.

The present guide is particularly adapted for use with gravity feed slicing machines such as the machine 10 illustrated in Fig. 1 in which the wings 8 and 13 of the chute 9 form a dihedral angle with one another and are disposed at an angle to the vertical but substantially perpendicular to the commodity support or gauge plate 34, the upper face of which lies in a plane substantially parallel to the plane of the rotary knife 35 with a tray or platform 36 disposed beneath the gauge plate 34 to receive the slices or cakes of meat as they are cut. With slicing machines 10 of this kind, the loaf 37 may rely upon gravity to advance along the guide 1 into supporting engagement with the gauge plate 34 when the latches 22 and 122 are open in the position shown in Fig. 4. In the operation of the machine, after the rotation of the knife 35 has been initiated, the meat is advanced to and from the knife 35 by the chute 9, the operator conventionally engaging the handle 40 when actuating the chute 9 to and from the knife 35 while gravity will be relied upon ordinarily to enable the loaf 37 to drop down into engagement with the gauge plate 34 as each succeeding cake has been cut and dispensed below the gauge plate 34 onto the tray 36.

Preferably the guide 1 is composed of a spring steel. Excellent results have been achieved when the guide 1 is composed of stainless steel, although obviously any number of flexible materials may be used without departing from the general spirit of the invention, such for instance as anodized aluminum, nickel plated brass, nickel plated copper, or even a flexible sheet of a plastic material such as polyvinyl chloride, conventionally known as "Vinylite," and the like. The composition of the hooks 7, 11, abutment 16 and plates 30 and 33 may be composed of the same material as the wall 5 of the guide 1 and the latches 22 and 122 in turn of any suitable wire having a diameter of about $\frac{3}{32}$ of an inch.

In the use of these guides, preferably a sheet of wax paper 38 is first fitted in the guide 1 where its longitudinal edges will overlap and its ends extend beyond the ends 14 and 17 of the wall 5. Thereupon the end of the paper 38 extending beyond the edge 14 will first be folded into a base such as shown in copending application for patent Ser. No. 223,631 aforesaid, transversely of and at right angles to the cylinder formed by the guide 1 when closed as shown in Fig. 2. Thereupon the chopped meat is packed into the guide 1 within the wax paper envelop 38 and thereupon the other end extending beyond the edge 17 will be folded to extend transversely of and at right angles to the guide 1 when closed. Thereupon the loaf 37 of chopped meat may be stored in a refrigerator or the like until the restaurant attendant is ready to dispense one or more orders. When preparing an order by cutting a cake of meat for cooking, such as frying, broiling or grilling a hamburger, the gauge plate 34 will be set a predetermined gauge or thickness by the knob 39 to enable the knife 35 to cut a conventional uniform thickness of chopped meat. Thereupon the loaded guide 1 will be attached to the chute 9 by securing the hook 7 to the upper edge of the wing 8 and the hook 11 onto the lateral edge 12 of the wing 13. The latches 22 and 122 will then be opened to permit the shield 1 to expand into the open position shown in Fig. 4 when the loaf 37 with its envelop 38 will be liberated from the guide 1 and be permitted by gravity under its own momentum to descend down through the guide 1 into cutting engagement with the knife 35. The paper envelop 38 need not be removed at this time since the knife 35 will cut the enclosing portion of paper 38 with each cake and the attendant can then remove the cut section of paper 38 from the cake after it has been cut.

When the order or orders required have been cut, the latches 22 and 122 may again be closed to close the shield 1 into its contracted position, and the guide 1 then removed and again stored away in the refrigerator or the like until the attendant is required to prepare another order. With the present invention a plurality of cakes of meat of a predetermined thickness may with facility be expeditiously cut not only to save considerable time in the cutting but also to save the time and care otherwise required to prepare the cake of the required shape and thickness.

The value of the protective paper, particularly a wax paper such as the paper 38, resides in the fact that when the latches 22 and 122 are opened to release the paper packed loaf 37, this loaf 37 so wrapped by the paper 38 will freely slide down by gravity under its own momentum, whereas if the loaf 37 were not wrapped in paper, the meat might cling to the metal shield 1, depending upon the nature of the meat and its temperature.

With the present improvement, as compared to the disclosure in the aforesaid copending application Ser. No. 223,631, it will be seen that should the latches 22 and 122 as an instance not lock the loaf 37 securely in the guide 1, there can be no danger of the loaf sliding out beyond the edge 14 even if the guide 1 were held upright with the edge 17 at the upper end and that the particles of meat will cling to one another sufficiently to prevent slippage of the loaf 37 so long as a goodly portion of the same is engaged as would be the case by the plate 16. Still furthermore, for some purposes it is desirable not to pack the meat too tightly in the guide 1, and consequently the latches 22 and 122 will not cause the guide 1 to anchor the loaf 37 against slippage without some assistance, such as by the plate 16. On the other hand, when the latches 22 and 122 are opened, and the loaf is intended to slide down by gravity, then the plate 16 must be quickly and expeditiously removed in the interest of efficiency. By securing the plate 16 through its arm 19 to the bracket 21 of the latch 22, the outward movement of the bracket 21 into open position will simultaneously swing with it the arm 19 and plate 16 out of the path of movement of the loaf 37.

It is obvious that various changes and modifications may be made to the details of construction without departing from the general spirit of the invention as set forth in the appended claims.

I claim:

1. In a guide for feeding a loaf of chopped food by gravity to the knife of a slicing machine in which the commodity chute has wings extending upwardly from a platform—the combination of a flexible shield, arcuate in form with its longitudinally extending edges spaced from, and adjacent to, one another in open position and overlapping in closed position to conform substantially to a cylinder, devices on the outer face of said shield connecting the shield to the edges of the wings of the chute with the lower open end resting on the platform of the chute, interlocking latches on the outer face of, and adjacent to, the longitudinally extending edges of the shield operable in one position to secure the shield in closed position and in another position to maintain the shield in open position, and an abutment secured to said latches, said abutment extending across the lower end of the shield in the path of movement of the loaf being fed down the guide when the shield is in closed position and swung clear of the lower end of the shield when the shield is in open position.

2. The combination as set forth in claim 1 in which the lower edge of the shield has a recess formed therein to enable the abutment to move into and out of position to obstruct the lower end of the shield.

3. The combination as set forth in claim 1 in which said interlocking latches are disposed adjacent to the lower end of the shield, and a second set of interlocking latches supplements the first mentioned set of latches and are disposed adjacent the upper end of the shield.

4. The combination as set forth in claim 1 in which each of said interlocking latches consists of two looped wires, one connected adjacent one longitudinal edge of the shield and the other connected adjacent the other longitudinal edge of the shield.

5. The combination as set forth in claim 1 in which the shield is composed of stainless spring steel.

ARNOLD W. LUNDELL.

References Cited in the file of this patent

UNITED STATES PATENTS

| Number | Name | Date |
| --- | --- | --- |
| 175,872 | Parent | Apr. 11, 1876 |
| 1,044,438 | Briggs | Nov. 12, 1912 |
| 1,139,550 | McCracken | May 18, 1915 |
| 2,235,509 | Waage | Mar. 18, 1941 |
| 2,275,524 | Cronich | Mar. 10, 1942 |
| 2,312,530 | Eklund | Mar. 2, 1943 |
| 2,611,250 | Rodacker | Sept. 23, 1952 |

FOREIGN PATENTS

| Number | Country | Date |
| --- | --- | --- |
| 523,927 | Great Britain | July 25, 1940 |